US010537969B2

(12) United States Patent
Lim

(10) Patent No.: US 10,537,969 B2
(45) Date of Patent: Jan. 21, 2020

(54) DEVICE WITH MULTIPLE UNITS FOR PROCESSING STRIPS OF MATERIAL

(71) Applicant: Seoul Laser Dieboard System Co., Ltd., San Diego, CA (US)

(72) Inventor: Kyong Chan Lim, San Diego, CA (US)

(73) Assignee: SEOUL LASER DIEBOARD SYSTEM CO., LTD., Foothill Ranch, CA (US)

( * ) Notice: Subject to any disclaimer, the term of this patent is extended or adjusted under 35 U.S.C. 154(b) by 321 days.

(21) Appl. No.: 15/153,625

(22) Filed: May 12, 2016

(65) Prior Publication Data

US 2016/0256966 A1 Sep. 8, 2016

Related U.S. Application Data

(63) Continuation-in-part of application No. 14/618,922, filed on Feb. 10, 2015, now abandoned, which is a (Continued)

(51) Int. Cl.
*B23P 15/28* (2006.01)
*B23D 37/22* (2006.01)

(Continued)

(52) U.S. Cl.
CPC .............. *B23P 15/28* (2013.01); *B21D 11/08* (2013.01); *B21D 37/205* (2013.01); *B23D 37/22* (2013.01);

(Continued)

(58) Field of Classification Search
CPC . Y10T 29/5197; Y10T 29/5198; Y10T 29/52; B26D 11/00; B26D 2011/005;

(Continued)

(56) References Cited

U.S. PATENT DOCUMENTS 2,006,925 A * 7/1935 Klemp .................. B21D 53/74 150/126
2,126,110 A * 8/1938 Hart ...................... B23D 37/06 269/58

(Continued)

FOREIGN PATENT DOCUMENTS

DE 3319797 A1 12/1983
DE 29703849 U1 7/1998

(Continued)

OTHER PUBLICATIONS

Extended European Search Report for EP 08847169.3, issued by the European Patent Office, dated Mar. 16, 2015.

(Continued)

*Primary Examiner* — Jason L Vaughan
(74) *Attorney, Agent, or Firm* — Procopio, Cory, Hargreaves & Savitch LLP

(57) ABSTRACT

Methods, devices, and apparatus for processing a strip of material including: measuring and feeding the strip of material to a predetermined length; and making broaching cuts on the strip of material using a plurality of cutting tools configured to make a plurality of angled cuts.

10 Claims, 14 Drawing Sheets

270
210 220 230 240 250 260
V cut
Flat cut
Uncoiling/ Levelling
Feeding
Broaching/ Engraving
Nicking
Printing
Rotary Punch
202
200

270
210 220 230 240 250 260
V cut T 510
Flat cut T 512
V cut B 518
Flat cut B 514
520 522 524
500 510 512 502 504 506 518 514 516
530 540

Related U.S. Application Data continuation of application No. 13/458,883, filed on Apr. 27, 2012, now Pat. No. 9,126,252, which is a continuation-in-part of application No. 13/133,133, filed as application No. PCT/US2008/082371 on Nov. 4, 2008, now abandoned.

(60) Provisional application No. 62/160,530, filed on May 12, 2015.

(51) Int. Cl.

| | |
|---|---|
| ***B23D 41/08*** | (2006.01) |
| ***G09F 7/16*** | (2006.01) |
| ***B21D 11/08*** | (2006.01) |
| ***G09F 7/00*** | (2006.01) |
| ***B21D 37/20*** | (2006.01) |

(52) U.S. Cl.

CPC ............. *B23D 41/086* (2013.01); *G09F 7/00* (2013.01); *G09F 7/16* (2013.01); *Y10T 29/49906* (2015.01); *Y10T 428/24777* (2015.01); *Y10T 428/24802* (2015.01); *Y10T 428/24917* (2015.01)

(58) Field of Classification Search

CPC ........ B23D 37/02; B23D 37/06; B23D 37/22; B23D 41/02; B23D 41/06; B23D 41/025

USPC .......................................................... 409/268

See application file for complete search history.

(56) References Cited

U.S. PATENT DOCUMENTS

| | | | | | |
|---|---|---|---|---|---|
| 2,189,984 | A * | 2/1940 | Hart | B23D 37/06 | 29/DIG. 101 |
| 2,386,838 | A * | 10/1945 | Bonnafe | B23D 37/06 | 269/32 |
| 2,539,095 | A | 1/1951 | McMath | | |
| 3,097,684 | A * | 7/1963 | Le Tarte | B21D 53/74 | 160/381 |
| 3,120,153 | A * | 2/1964 | Proctor | B23D 37/06 | 29/33 S |
| 3,254,436 | A | 6/1966 | Bank | | |
| 3,296,991 | A * | 1/1967 | Rawson | B21D 53/74 | 72/335 |
| 3,380,145 | A * | 4/1968 | Stroud | B21D 53/74 | 29/411 |
| 3,393,547 | A * | 7/1968 | Kortan | B21D 5/08 | 72/131 |
| 3,675,355 | A | 7/1972 | Shanok | | |
| 3,696,655 | A * | 10/1972 | Hinks | B21D 11/10 | 72/14.8 |
| RE27,665 | E * | 6/1973 | Spain | B21D 53/42 | 409/259 |
| 3,799,030 | A * | 3/1974 | Schubert | B23D 37/10 | 409/251 |
| 3,835,613 | A | 9/1974 | Davies | | |
| 3,854,359 | A * | 12/1974 | Tagami | B21D 28/06 | 83/212 |
| 3,879,979 | A * | 4/1975 | Arai | B21D 53/74 | 72/14.8 |
| 3,937,384 | A | 2/1976 | Minogue et al. | | |
| 3,974,552 | A | 8/1976 | Minogue et al. | | |
| 3,982,457 | A * | 9/1976 | Berry | B21C 37/104 | 83/516 |
| 4,097,632 | A | 6/1978 | Minogue et al. | | |
| 4,140,405 | A | 2/1979 | Shapiro et al. | | |
| 4,403,489 | A * | 9/1983 | Munsterman | B21D 28/22 | 29/596 |
| 4,462,237 | A * | 7/1984 | Kauferle | B21D 53/74 | 72/324 |
| 4,597,521 | A * | 7/1986 | Wilson | B21B 15/0007 | 228/160 |
| 4,696,211 | A * | 9/1987 | Bitzel | B21D 28/04 | 83/373 |
| 5,018,263 | A * | 5/1991 | Stern | B21D 35/00 | 160/371 |
| 5,456,099 | A | 10/1995 | Lipari et al. | | |
| 5,463,890 | A * | 11/1995 | Tachibana | B21D 7/02 | 72/294 |
| 5,478,180 | A * | 12/1995 | Hazama | B23D 37/00 | 409/287 |
| 5,598,737 | A * | 2/1997 | Oide | B21D 5/0209 | 30/180 |
| 5,689,986 | A * | 11/1997 | Jacobs, Jr. | B23D 15/00 | 72/11.1 |
| 5,771,725 | A * | 6/1998 | Mizukawa | B21D 5/045 | 72/17.3 |
| 5,774,964 | A * | 7/1998 | Fisher | H01L 21/4882 | 257/E23.102 |
| 5,799,557 | A | 9/1998 | Wang | | |
| 5,881,591 | A * | 3/1999 | Ondracek | B21D 5/04 | 72/14.9 |
| 5,919,015 | A * | 7/1999 | Mason | B23D 41/08 | 409/244 |
| 5,970,769 | A * | 10/1999 | Lipari | B21D 5/02 | 33/758 |
| 6,145,359 | A * | 11/2000 | Park | B21D 11/10 | 72/17.3 |
| 6,158,264 | A * | 12/2000 | Mizukawa | B21D 37/205 | 72/294 |
| 6,167,740 | B1 * | 1/2001 | Lipari | B21D 7/00 | 72/306 |
| 6,227,026 | B1 * | 5/2001 | Mizukawa | B21D 37/205 | 30/229 |
| 6,422,050 | B1 | 7/2002 | Ho | | |
| 6,648,568 | B2 * | 11/2003 | Roseliep | B23D 37/08 | 384/45 |
| 7,117,576 | B2 * | 10/2006 | LaSusa | E06B 3/96 | 29/458 |
| 7,147,595 | B1 | 12/2006 | Chen | | |
| 7,225,725 | B2 | 6/2007 | Trestain | | |
| 7,237,309 | B2 | 7/2007 | Nicaise | | |
| 7,546,793 | B2 * | 6/2009 | LaSusa | B23P 15/00 | 83/522.19 |
| 8,793,580 | B2 | 7/2014 | Robinson | | |
| 9,021,847 | B2 * | 5/2015 | Chen | B23D 1/26 | 72/127 |
| 2002/0094251 | A1 * | 7/2002 | Roseliep | B23D 37/08 | 409/254 |
| 2004/0031177 | A1 | 2/2004 | Gordon et al. | | |
| 2004/0231277 | A1 | 11/2004 | Rosskamp | | |
| 2005/0005746 | A1 | 1/2005 | Linenberger | | |
| 2005/0084356 | A1 * | 4/2005 | Park | B23D 37/12 | 409/259 |
| 2008/0134744 | A1 | 6/2008 | Tubach | | |
| 2010/0031799 | A1 * | 2/2010 | Ast | B23B 27/06 | 83/875 |

FOREIGN PATENT DOCUMENTS

| | | | |
|---|---|---|---|
| FR | 822442 | A | 3/1960 |
| GB | 1442461 | A | 7/1976 |
| JP | 07251387 | A | 10/1995 |
| JP | 8-30050 | A | 11/1996 |
| JP | 2002178040 | A | 6/2002 |
| KR | 1002333350000 | B1 | 12/1999 |
| KR | 1003888890000 | B1 | 6/2003 |
| KR | 1020030043131 | A | 6/2003 |
| KR | 10-2006-0077083 | A | 9/2007 |
| WO | 2007133550 | A2 | 11/2007 |
| WO | 2008135454 | A1 | 11/2008 |

OTHER PUBLICATIONS

International Search Report and Written Opinion for International Patent Application No. PCT/US2008/082371, in 10 pages.

* cited by examiner

DEVICE WITH MULTIPLE UNITS FOR PROCESSING STRIPS OF MATERIAL

CROSS-REFERENCE TO RELATED APPLICATIONS

This application is a continuation-in-part application of U.S. patent application Ser. No. 14/618,922, filed Feb. 10, 2015, entitled "Profiles used in Generating Channel Letters," which is a continuation of U.S. patent application Ser. No. 13/458,883, filed Apr. 27, 2012, entitled "Generating Channel Letters Using Profiles," (now U.S. Pat. No. 9,126,252) which is a continuation-in-part application of U.S. patent application Ser. No. 13/133,133, filed Jan. 10, 2012, and entitled "Methods and Apparatus for Cutting Profiles," which is a national stage entry of PCT Application No. PCT/US08/82371, filed Nov. 4, 2008. This application also claims the benefit of priority under 35 U.S.C. § 119(e) of U.S. Provisional Patent Application No. 62/160,530, filed May 12, 2015, entitled "Device with Multiple Units for Processing Strips of Material."

BACKGROUND

Field of the Invention

The present invention relates to a device with multiple units, and more particularly, to a device with multiple units for processing strips of material.

Background

Generally, a cutting blade is attached to a pattern board for use in pressing a folding or a cutting line on plate matters such as paper, canvas, leather, plastic, etc. The plate matters with such pressed folding and/or cutting lines (i.e., the pressed lines) can be used in a folded shape like a box (e.g., a pizza box), card (e.g., a greeting card), or other similar items. Accordingly, in order to assemble the plate matter into a predetermined shape with the cutting blade, it is necessary to process and fold the cutting blade into a shape suitable for forming the pressed line.

SUMMARY

The present invention provides methods and devices for processing strips of material.

In one embodiment, a device for processing a strip of material is disclosed. The device includes: a feeding unit configured to measure and feed the strip of material to a predetermined length; and a broaching unit configured to make broaching cuts on the strip of material, the broaching unit including a plurality of cutting tools configured to make a plurality of angled cuts.

In another embodiment, a method for processing a strip of material is disclosed. The method includes: measuring and feeding the strip of material to a predetermined length; and making broaching cuts on the strip of material using a plurality of cutting tools configured to make a plurality of angled cuts.

In another embodiment, an apparatus for processing a strip of material is disclosed. The apparatus includes: means for measuring and feeding the strip of material; means for making broaching cuts of varying angles on the strip of material; and means for controlling the means for measuring and feeding to determine an appropriate length to feed the strip of material into the apparatus and to determine the varying angles for the broaching cuts Other features and advantages of the present invention should be apparent from the present description which illustrates, by way of example, aspects of the invention.

BRIEF DESCRIPTION OF THE DRAWINGS

The details of the present disclosure, both as to its structure and operation, may be gleaned in part by study of the accompanying drawings.

DETAILED DESCRIPTION

As stated above, prior to folding and attaching a cutting blade to a pattern board, the cutting blade needs to be processed so that the cutting blade attaches to the pattern board and is able to cut and/or press the plate matter properly. Certain embodiments as disclosed herein provide for a device with multiple units for processing strips of material such as a metallic cutting blade. References will be made in detail to these embodiments including examples illustrated in the accompanying drawings. Technical structure and operation of the device will be described with reference to the drawings in FIG. 2 through FIG. 12D.

Figure 1:
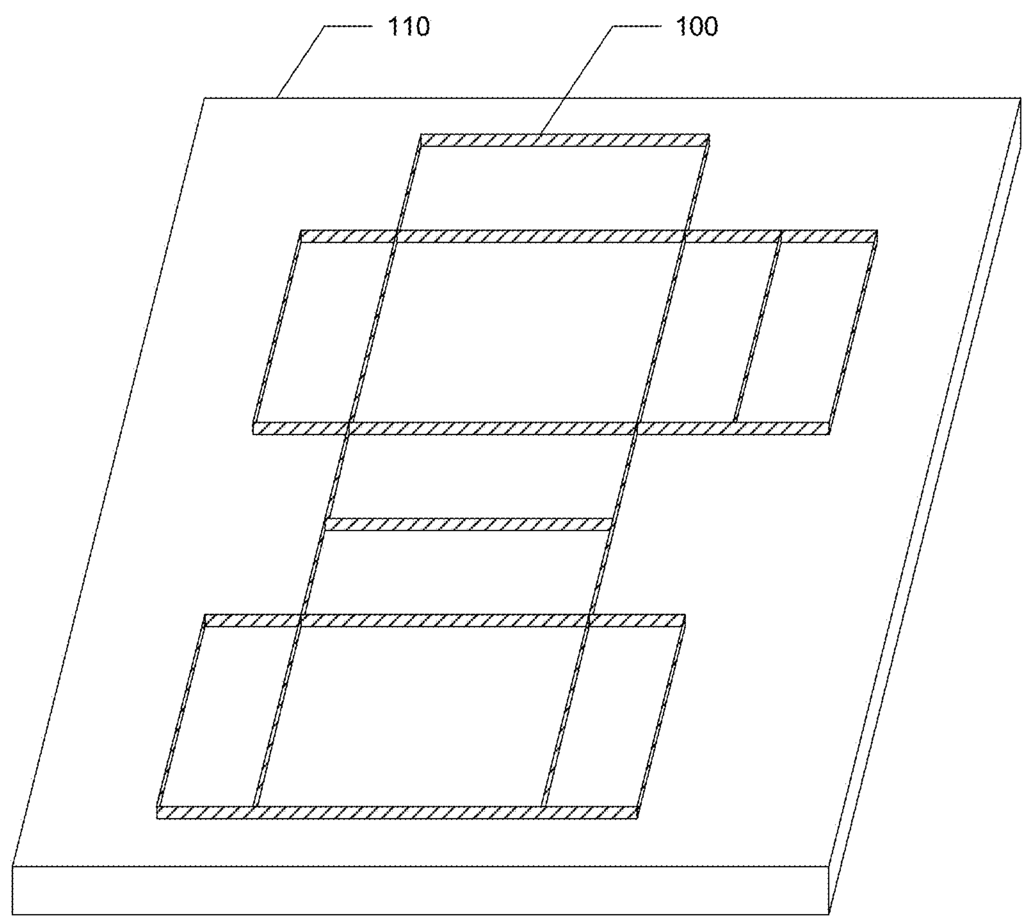
FIG. 1 shows one example of a cutting blade attached to a pattern board.

FIG. 1 shows one example of a cutting blade 100 attached to a pattern board 110 (often referred to as a die-board). As shown, the cutting blade 100 of FIG. 1 is folded in a shape suitable for forming the pressed line in the predetermined shape. However, prior to folding or bending the cutting blade 100, the cutting blade needs to be processed so that the cutting blade 100 attaches to the pattern board 110 and is able to cut and/or press the plate matter properly. In other embodiments, the processing described below is done subsequent to the folding or bending.

Figure 2:
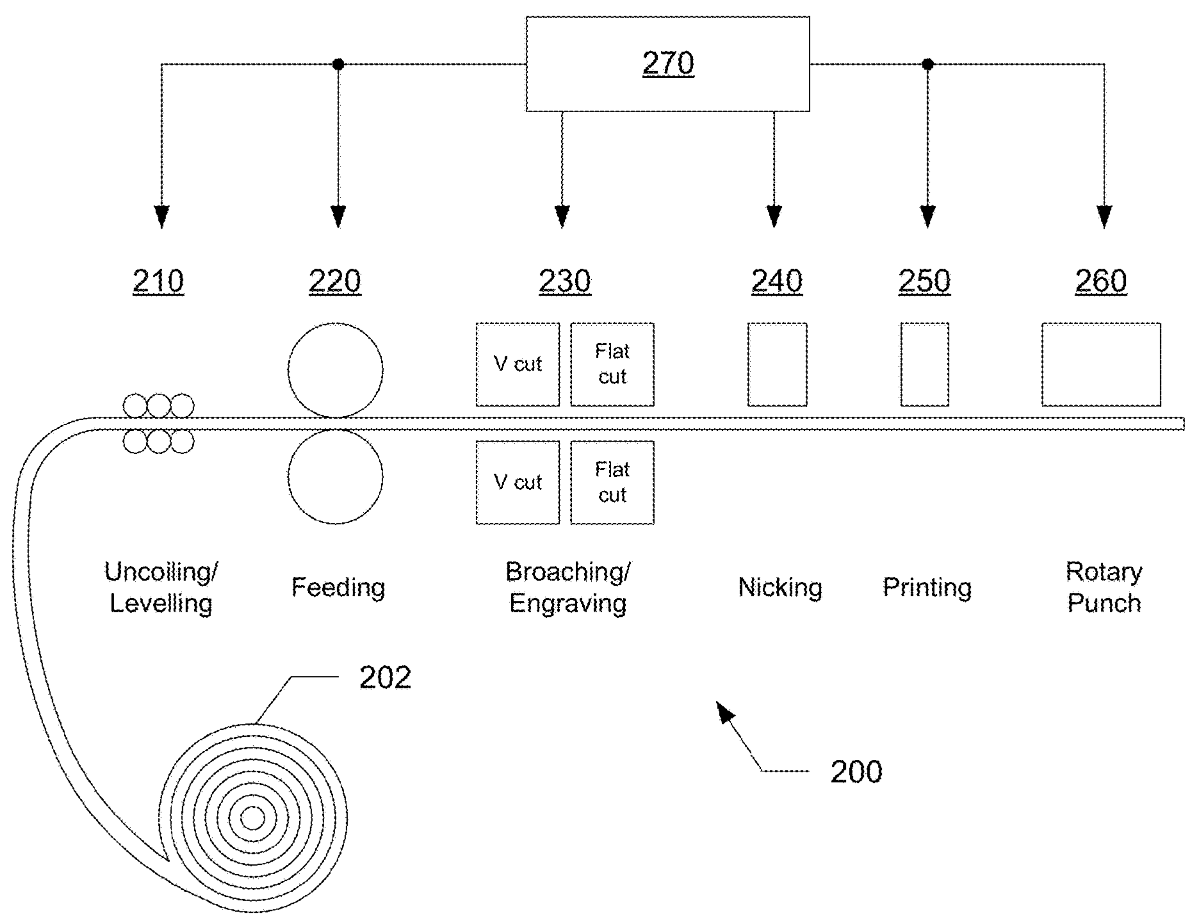
FIG. 2 is a functional block diagram of a device with multiple units for processing strips of material in accordance with one embodiment of the present disclosure.

FIG. 2 illustrates a device 200 with multiple units for processing strips of material in accordance with one embodiment of the present disclosure. In the illustrated embodiment of FIG. 2, a roll of material 202 is rotatably mounted on a rotating table which may be mounted on the device 200 for supplying the strips of material to be prepared by the device 200 and subsequently bent by a bending/folding device (not shown). In one embodiment, the material is a cutting blade used in a die board. In another embodiment, the material is a rule (typically metal) bent for various purposes including making channel letters. In one embodiment, the bending/folding device is part of the device 200. In another embodiment, the bending/folding device is separate from the device 200. Typically, the material comes in a roll (e.g., roll 202), but it can also be supplied to the device 200 in strips of material.

In the illustrated embodiment of FIG. 2, the device 200 includes an uncoiling/levelling unit 210, a feeding unit 220, a broaching unit (also referred to as an engraving unit) 230, a nicking unit 240, a printing unit 250, and a rotary punch unit 260. Although FIG. 2 shows all units 210, 220, 230, 240, 250, 260 included in the device 200, the device 200 may include less than all units. For example, when the device 200 is configured for preparing and/or bending the rule to make channel letters, some units such as the nicking unit 240, printing unit 250, and/or rotary punch unit 260 may not be needed in the device 200. In another example, when the device 200 is configured for a strip of material rather than the roll of material 202. In a further embodiment, the device 200 includes a controller 270 which controls the units 210, 220, 230, 240, 250, 260.

The uncoiling/levelling unit 210 uncoils and levels the strip of material received from the roll 202. The feeding unit 220 measures and feeds (advances and/or retreats) the strip of material to a predetermined length. For example, the controller 270 may determine that the final pattern of the shape (e.g., the shape to be inserted into the pattern board or the shape of the channel letter) needs to be at the predetermined length. The broaching unit 230 is used to provide broaching cuts on the strip of material. In one embodiment, a V cut is made to enable the strip of material to be bent. In another embodiment, a flat cut is made to enable insertion of another strip, for example, in a T intersection. In a further embodiment, the broaching unit 230 includes a plurality of cutting tools to make various cuts on the strip of material. For example, the plurality cutting tools can be configured to make various different angles of V cuts to enable the strip of material to be folded in several different angles.

The nicking unit 240 provides a small cut on the tip of the blade side of the strip of material. The printing unit 250 marks each strip so that it can be identified when the strips of material are inserted into a die board. The rotary punch unit 260 is used to provide a notching cut on the strip of material.

In a further embodiment, the device 200 may include a post-cutting unit (not shown) which cuts the strip of material. In an alternative embodiment, the function of the post-cutting unit can be done using the broaching unit 230 or the rotary punch 260. In a case in which the broaching unit 230 is used for post cutting, the broaching unit 230 should be configured to be positioned at the end, after the rotary punch unit 260.

Figure 3:
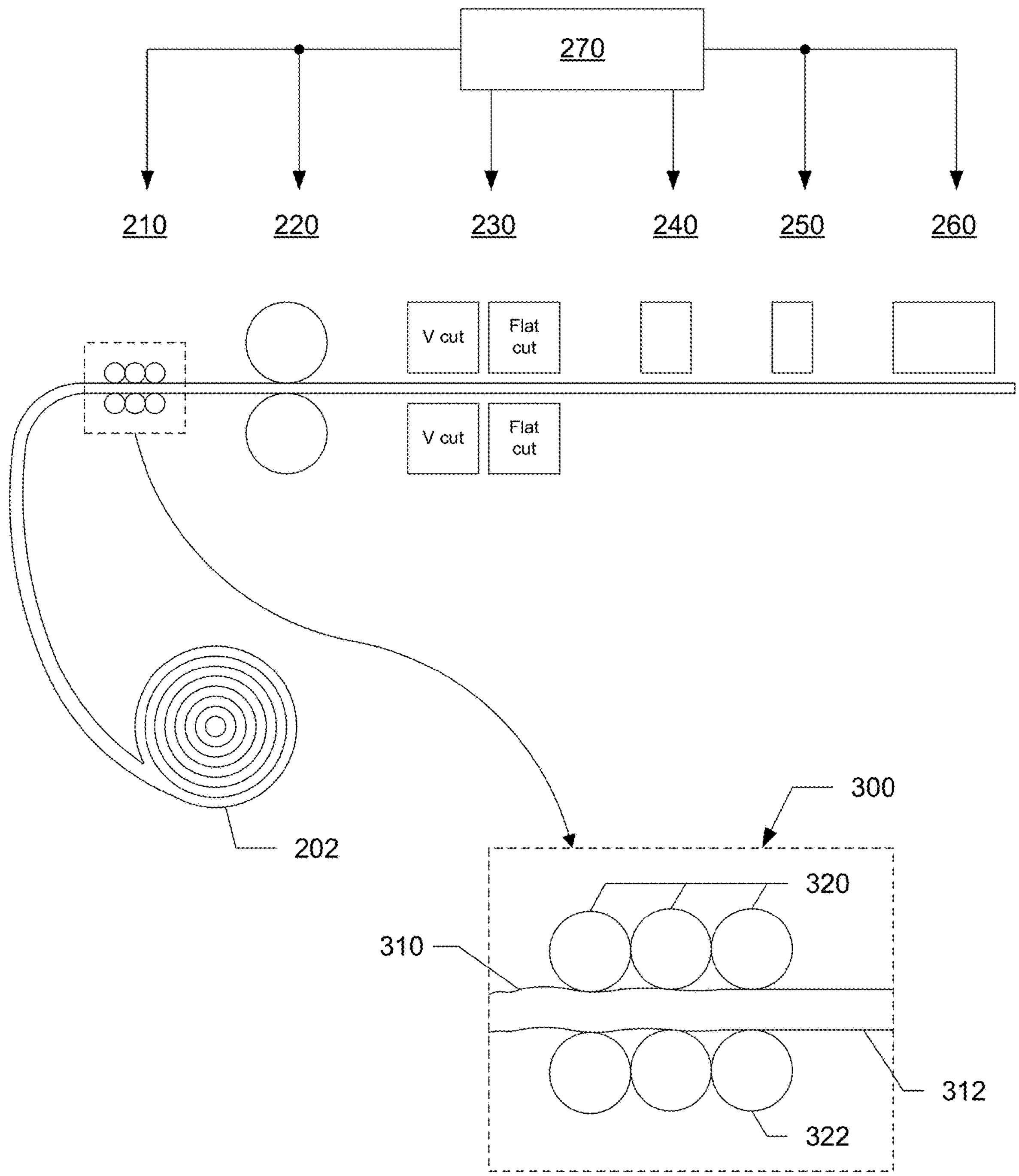
FIG. 3 is a detailed functional block diagram of an uncoiling/levelling unit in accordance with one embodiment of the present disclosure.

FIG. 3 shows a detailed view 300 of an uncoiling/levelling unit 210 in accordance with one embodiment of the present disclosure. FIG. 3 shows that the material coming out of the roll 202 is uneven and crooked because the material had been rolled up. To address the uneven material problem, top rollers 320 and bottom rollers 322 are pressed toward each other as the material is fed into the device 200 (at point 310) between the top rollers 320 and the bottom rollers 322. FIG. 3 shows that the material coming out of the uncoiling/levelling unit 210 (at point 312) is now relatively even and straight compared to the material coming out of the roll (at point 310).

Figure 4:
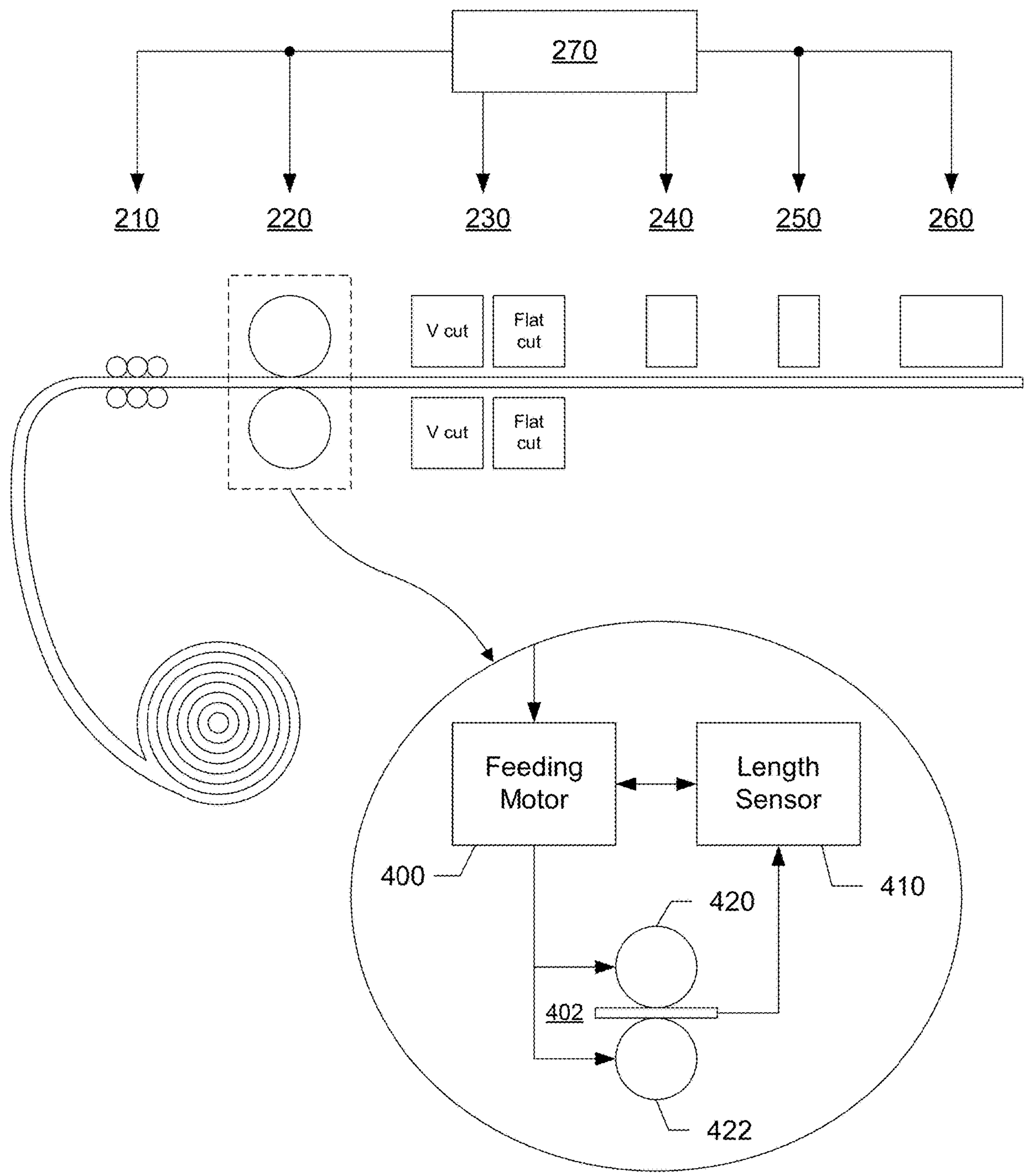
FIG. 4 is a detailed functional block diagram of a feeding unit in accordance with one embodiment of the present disclosure.

FIG. 4 is a functional block diagram of a feeding unit 220 in accordance with one embodiment of the present disclosure. The feeding unit 220 includes a length sensor 410 which measures the length of the strip of material 402 and a feeding motor 400 which feeds (advances and/or retreats) the strip of material by controlling the rollers 420, 422. Thus, in one embodiment, the length sensor 410 measures the length of the strip of material 402 needed to form the pattern for the pattern board or the design for the channel letter, and directs the feeding motor 400 to feed the strip of material 402 to an appropriate length.

Figure 5:
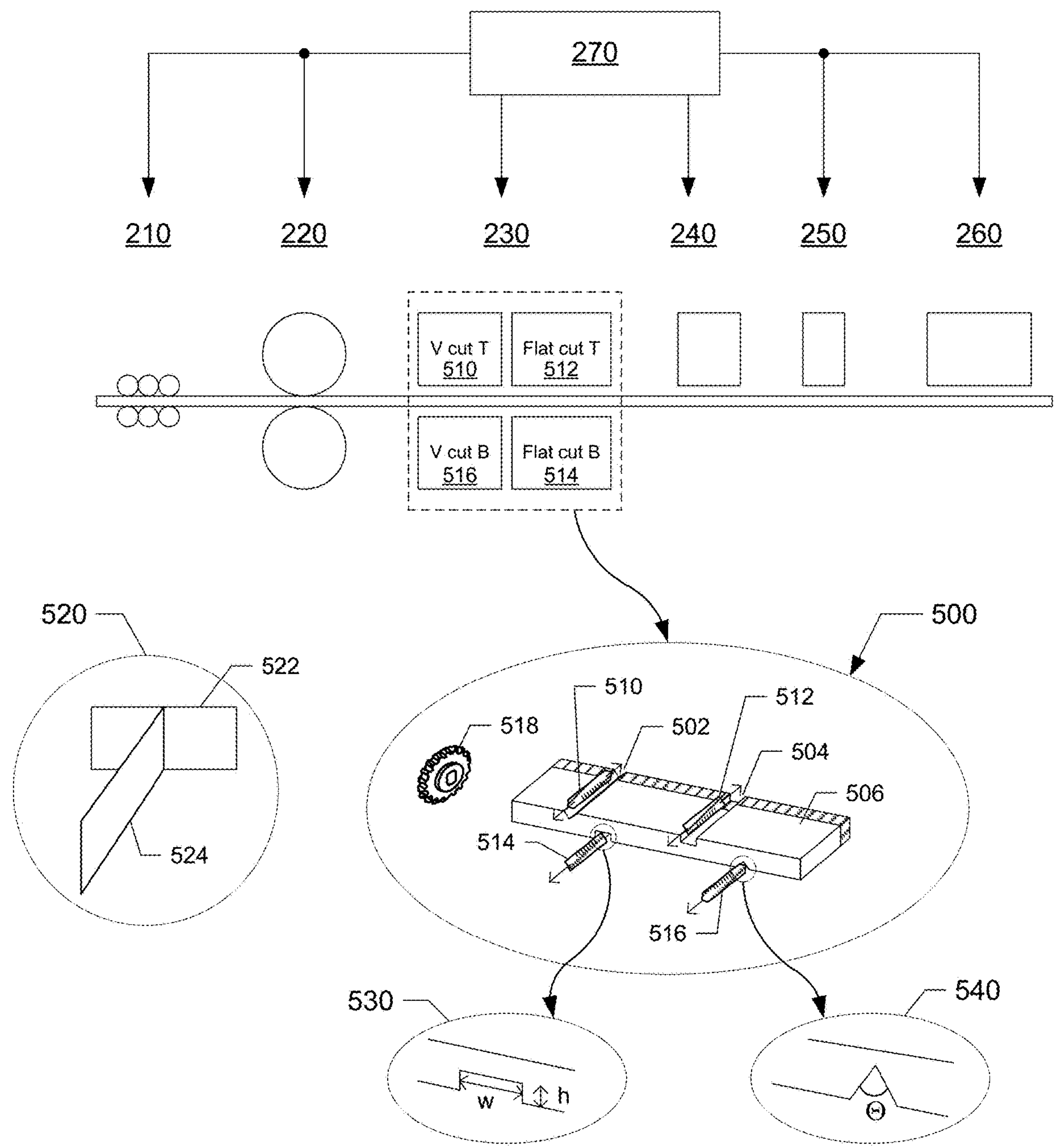
FIG. 5 is a detailed view of a broaching unit in accordance with one embodiment of the present disclosure.

FIG. 5 is a detailed view 500 of a broaching unit 230 in accordance with one embodiment of the present disclosure. The broaching unit 230 is used to provide broaching cuts 502, 504 on the strip of material 506. In FIG. 5, the broaching unit 230 includes a top V cut broaching tool 510, a top flat cut broaching tool 512, a bottom V cut broaching tool 516, and a bottom flat cut broaching tool 514. However, in an alternative, any number of broaching tools can be used. In one embodiment, a V cut 502 is made to enable the strip of material to be bent (or cut). In the illustrated embodiment of FIG. 5, it can be seen that the cuts are made on both sides of the strip of the material.

In another embodiment, a flat cut 504 is made to enable insertion of another strip, for example, in a T intersection. Insert FIG. 520 shows two strips of material 522, 524 where one strip 524 is inserted into a flat cut in another strip 522.

In the illustrated embodiment of the detailed view 500, the broaching cuts are made using broaching tools that are linear. However, the broaching cuts can be made with rotating tools such as a rotating saw 518 shown in the view 500. Insert FIGS. 530, 540 show various parameters of the broaching cut including varying widths and heights of the flat cut and varying angles of the V cut.

Figure 6:
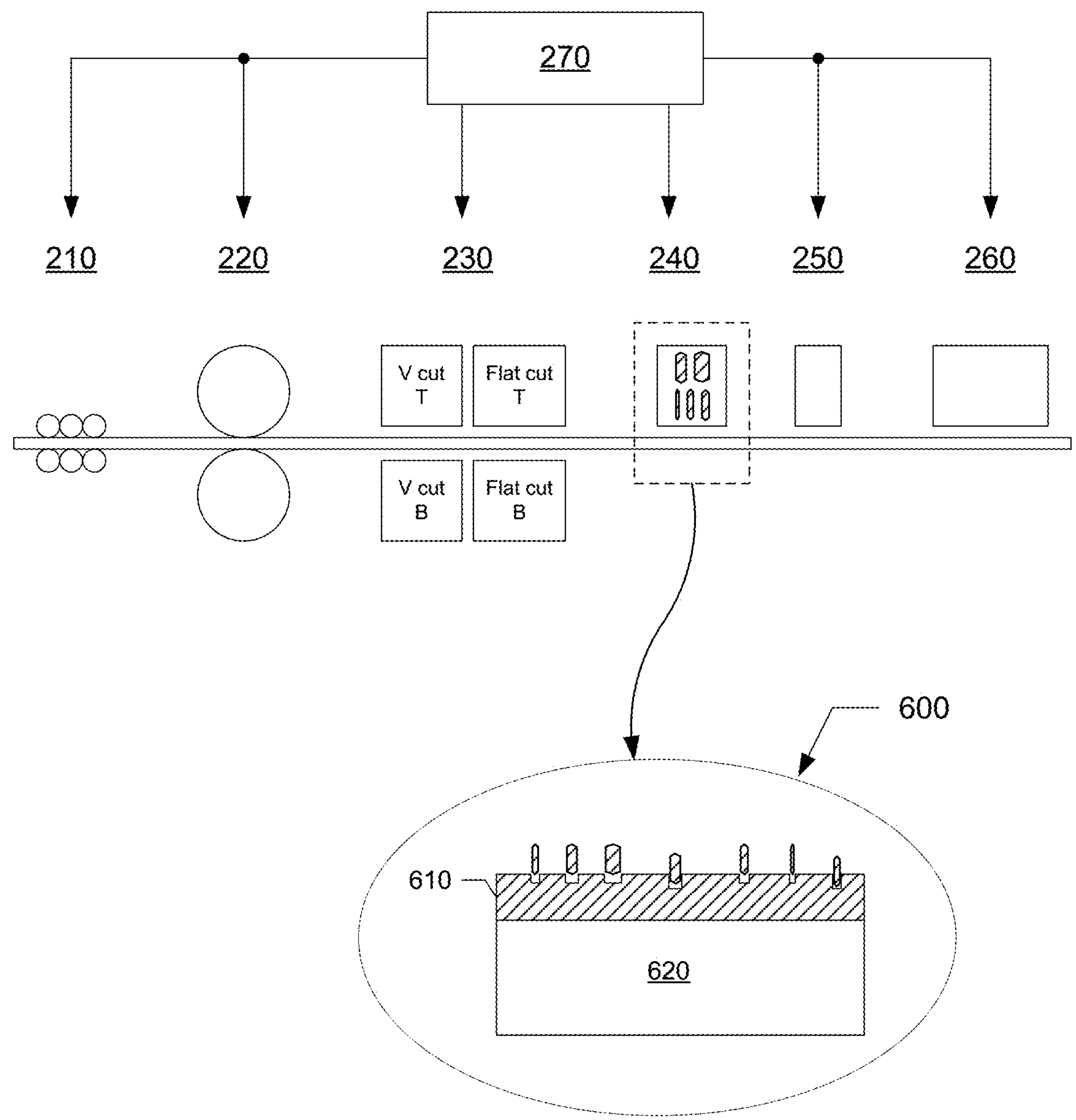
FIG. 6 is a detailed view of a nicking unit in accordance with one embodiment of the present disclosure.

FIG. 6 is a detailed view 600 of a nicking unit 240 in accordance with one embodiment of the present disclosure. The nicking unit 240 includes a plurality of nicking tools of various sizes which makes small cuts on the tip of the blade side 610 of the strip of material 620. The nicking cuts on the tip of the blade side 610 allow the pattern of cutting blade to make pressing marks on a plate matter without cutting the plate matter.

Figure 7:
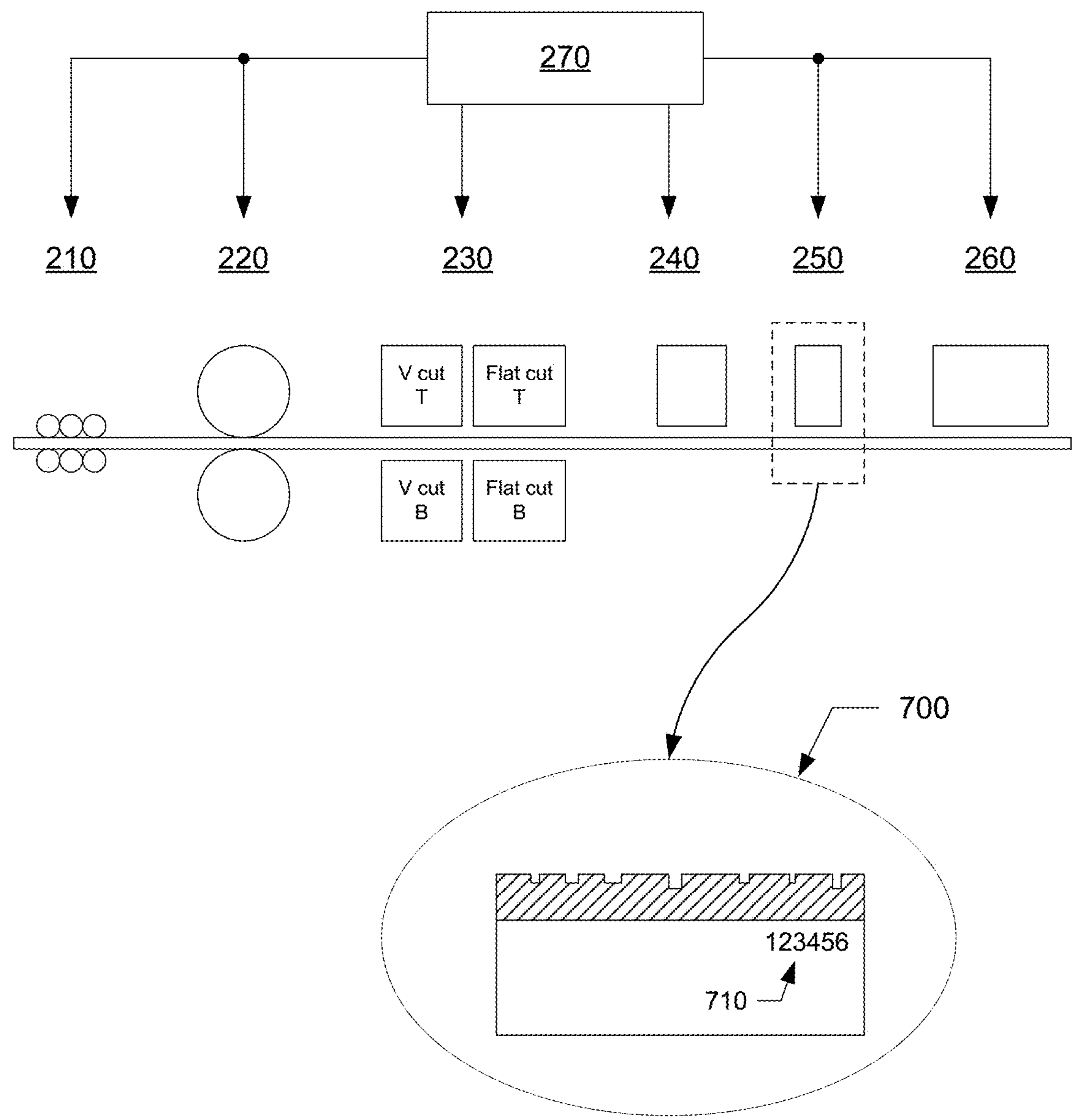
FIG. 7 is a detailed view of a printing unit in accordance with one embodiment of the present disclosure.

FIG. 7 is a detailed view 700 of a printing unit 250 in accordance with one embodiment of the present disclosure. The printing unit 250 marks each strip with an identifier 710 so that it can be identified when the strips of material are inserted into a die board. In the illustrated embodiment of the detailed view 700, the identifier 710 is a number. In other embodiments, the identifier can be any identifying mark such as a logo.

Figure 8:
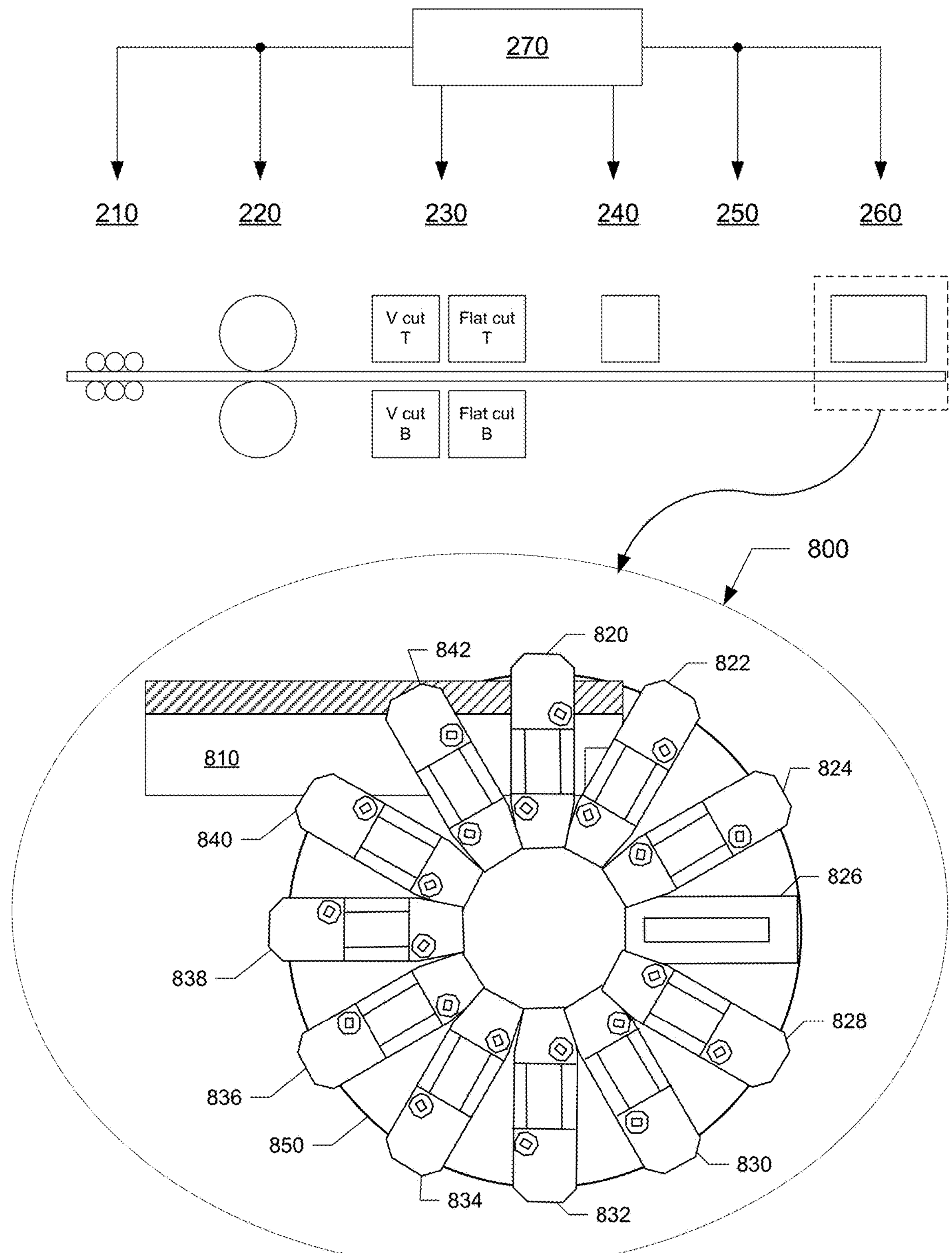
FIG. 8 is a detailed view of a rotary punch unit in accordance with one embodiment of the present disclosure.

FIG. 8 is a detailed view 800 of a rotary punch unit 260 in accordance with one embodiment of the present disclosure. The rotary punch unit 260 is used to provide a notching cut on the strip of material. The detailed view 800 illustrates a strip of material 810 passing through the rotary punch unit 260, which, in one embodiment, includes 12 punch tools 820-842 of various shapes and a base 850. The desired punch shape (e.g., 820) selected as the punch tool is moved above the strip of material 810. The controller 270 presses the punch tool with a desire shape onto the strip of material 810.

Figure 9A:
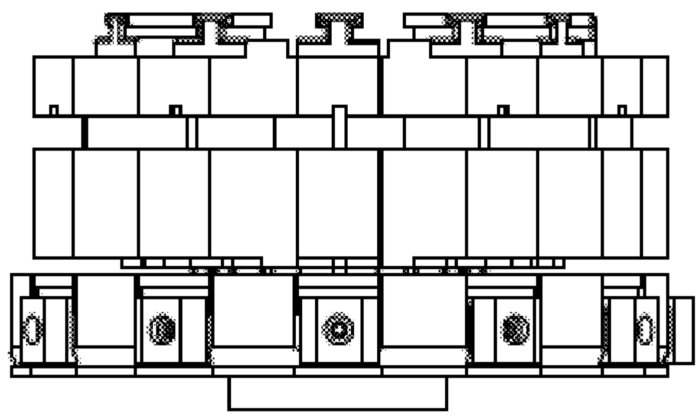
FIG. 9A is a side view of the rotary punch unit in accordance with one embodiment of the present disclosure.
Figure 9B:
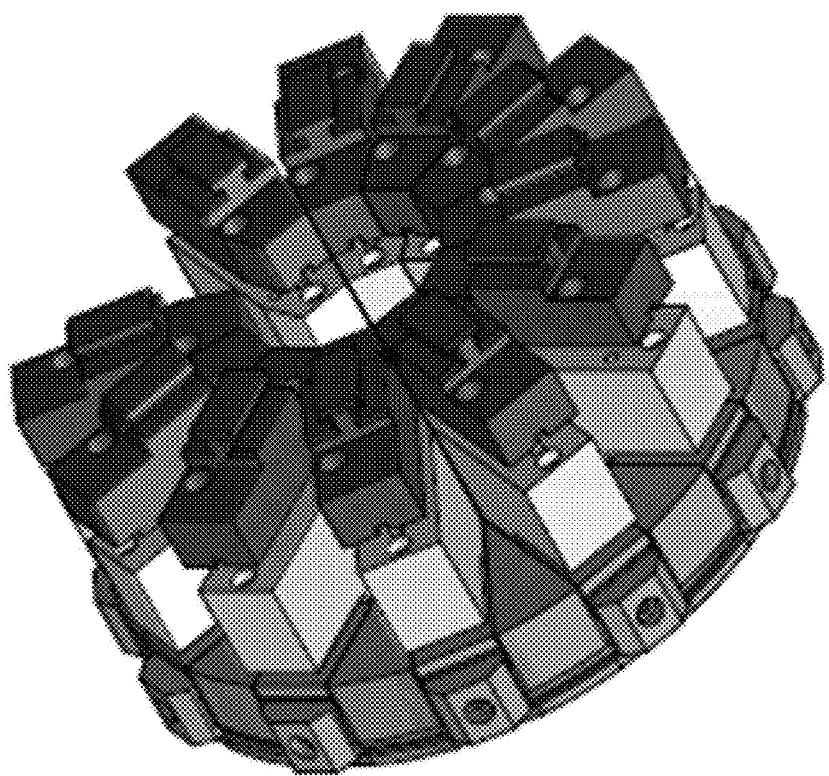
FIG. 9B is a side perspective view of the rotary punch unit in accordance with one embodiment of the present disclosure.

FIG. 9A is a side view of the rotary punch unit 260, while FIG. 9B is a side perspective view of the rotary punch unit 260.

Figure 10A:
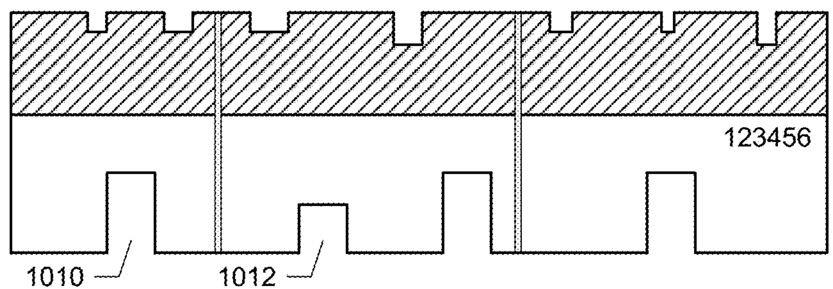
FIG. 10A is the strip of material with rectangular and square shapes made by the rotary punch unit in accordance with one embodiment of the present disclosure.
Figure 10B:
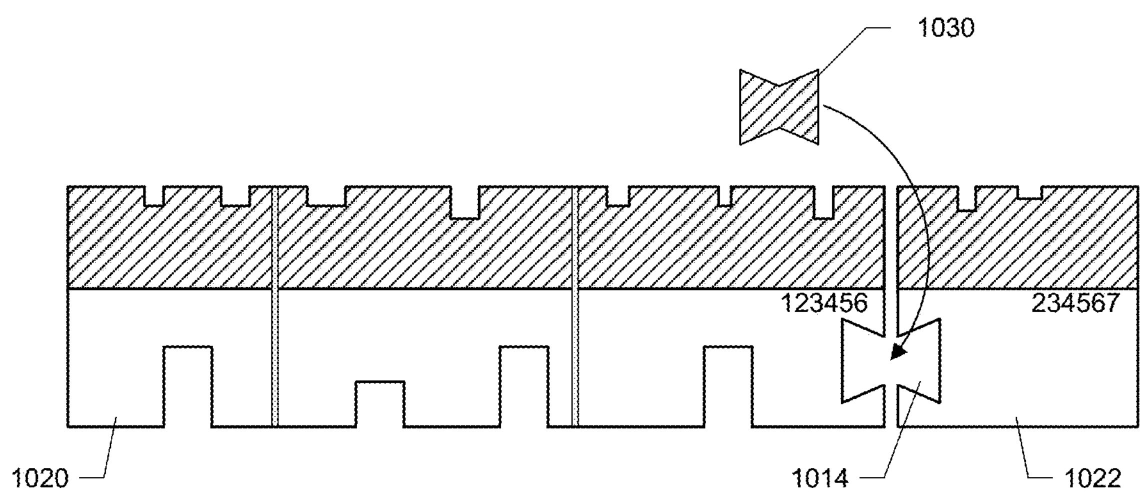
FIG. 10B is the strip of material with a butterfly shape made by the rotary punch unit in accordance with one embodiment of the present disclosure.
Figure 10C:
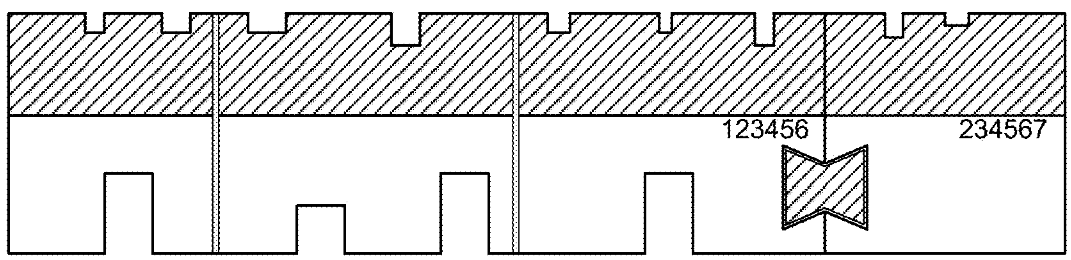
FIG. 10C is the resultant connection of the two pieces of the strip of material in accordance with one embodiment of the present disclosure.

FIG. 10A, FIG. 10B, and FIG. 10C show various cuts made on the strip of material by the rotary punch unit 260 (as well as a nicking unit). FIG. 10A shows a rectangular shape 1010 and a square shape 1012 made by the rotary punch unit 260. FIG. 10B shows a butterfly shape 1014 made by the rotary punch unit 260. Once the butterfly shape 1014 is made by the punch unit 260, the strip of material can be cut into two pieces 1020, 1022. Later, the two pieces 1020, 1022 can be attached by inserting an insert butterfly shape 1030 into the shape 1014. FIG. 10C shows the resultant connection of the two pieces of the strip of material.

Figure 11A:
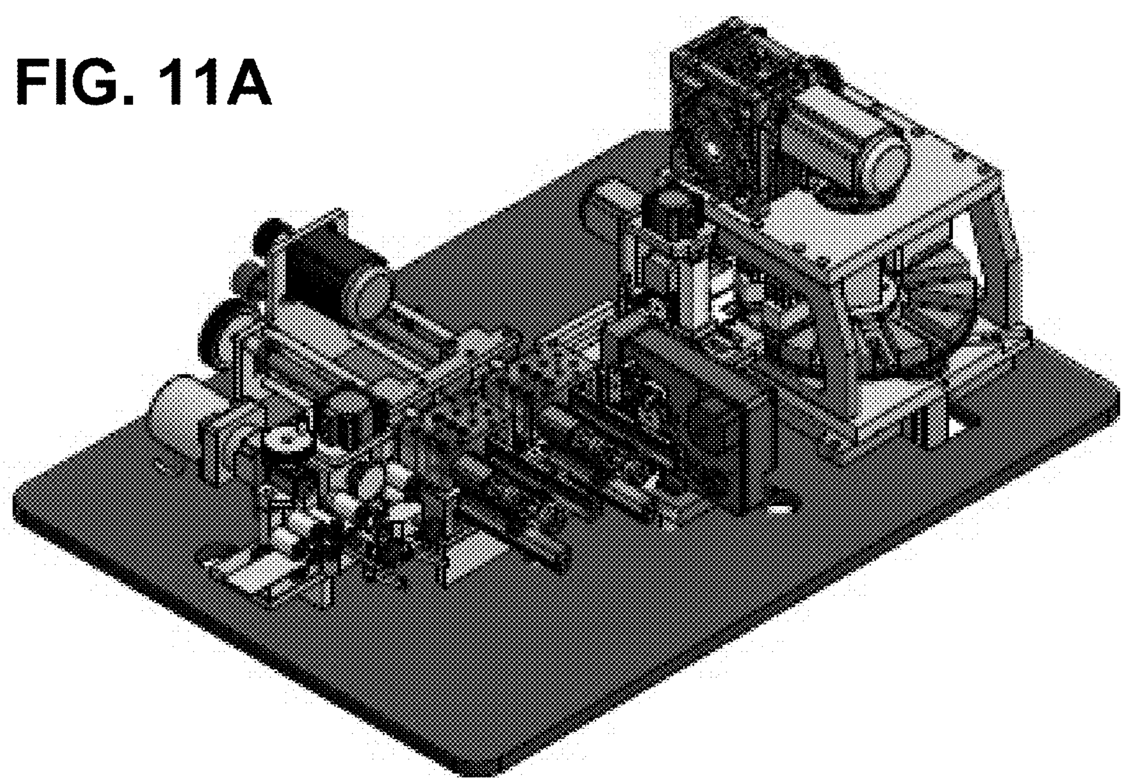
FIG. 11A is one perspective views of the device with multiple units in accordance with one embodiment of the present disclosure.
Figure 11B:
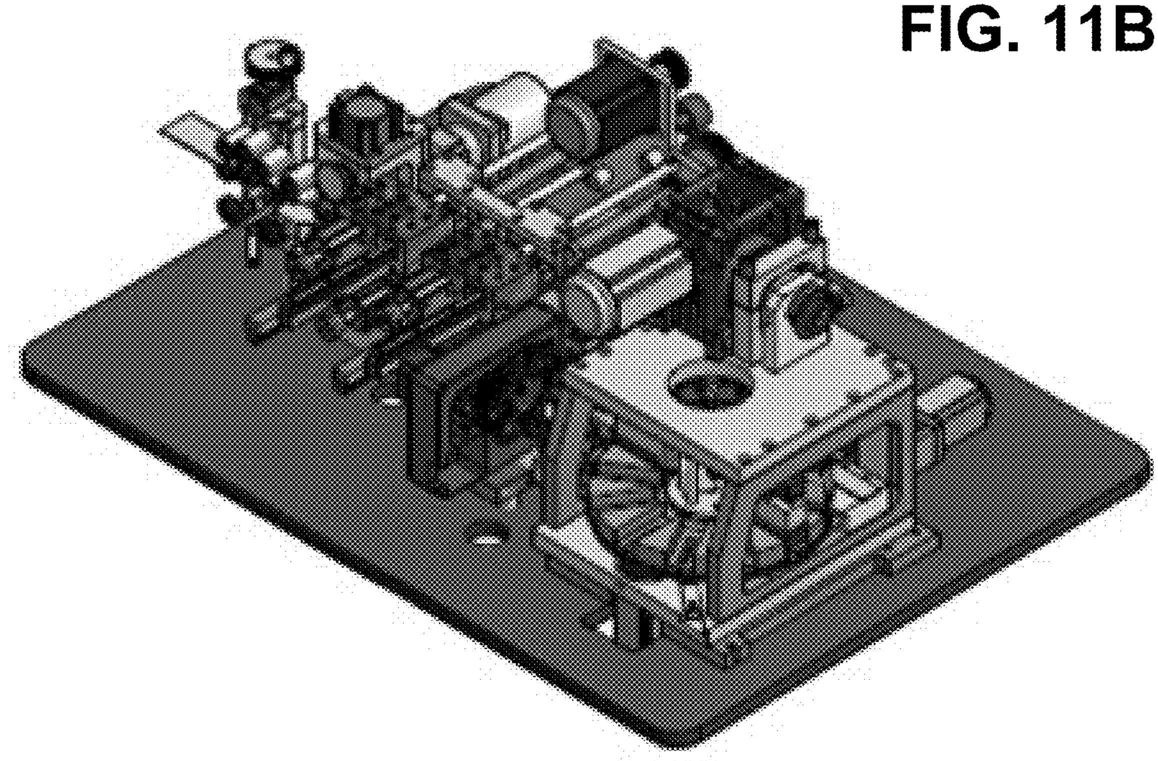
FIG. 11B is another perspective views of the device with multiple units in accordance with one embodiment of the present disclosure.
Figure 12A:
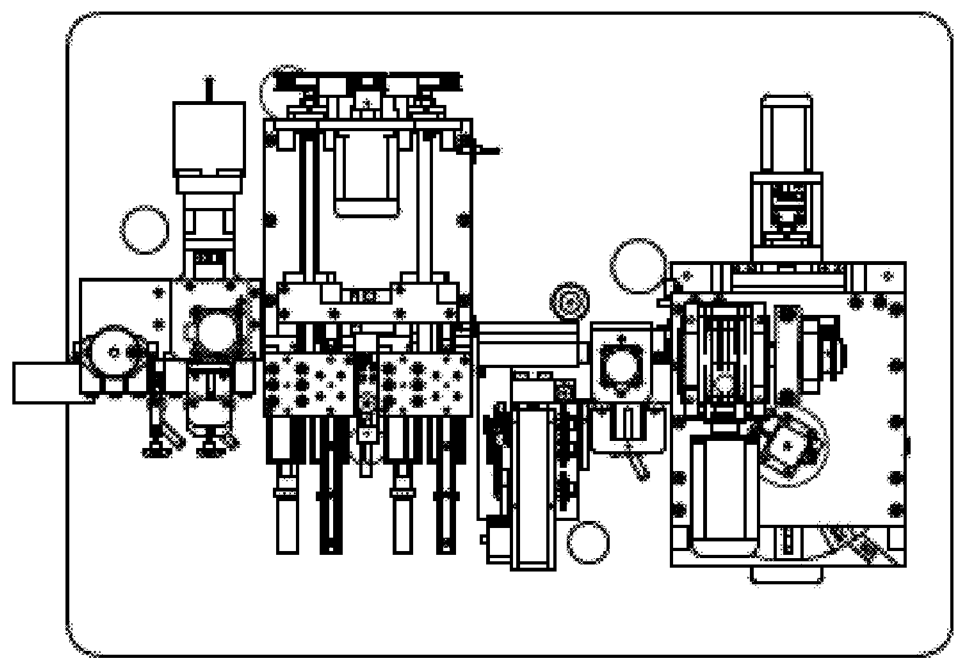
FIG. 12A, FIG. 12B, FIG. 12C, and FIG. 12D show four different views of the device with multiple units in accordance with embodiments of the present disclosure.
Figure 12B:
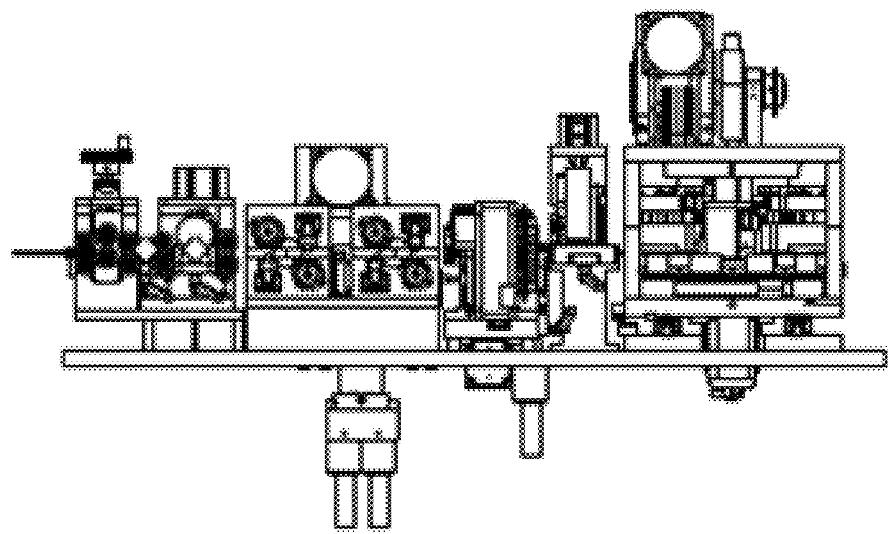
Figure 12C:
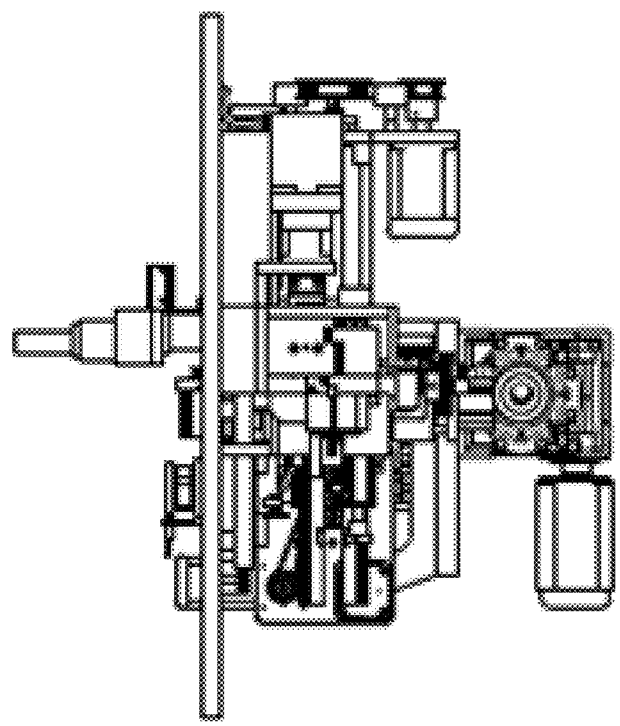
Figure 12D:
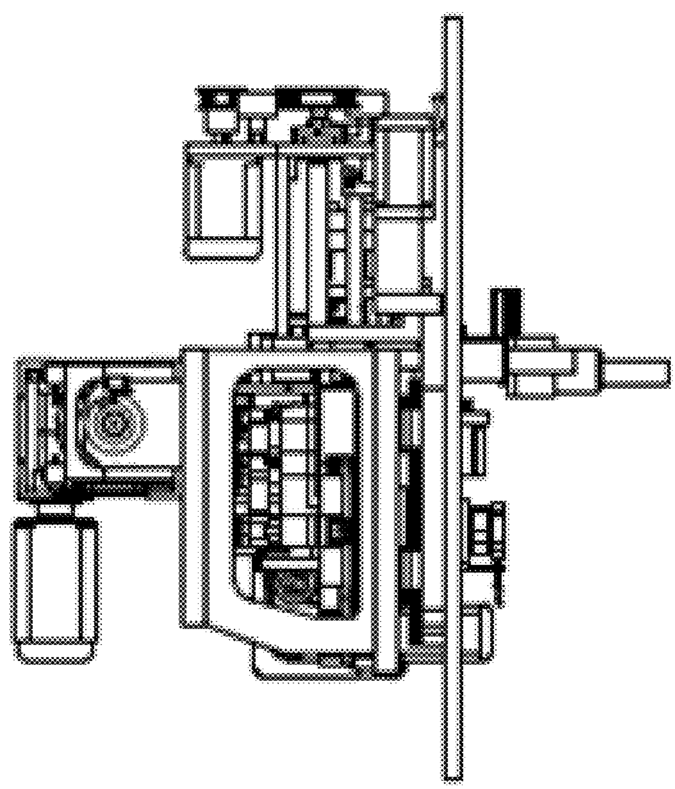

FIG. 11A and FIG. 11B show two perspective views of the device 200.

FIG. 12A, FIG. 12B, FIG. 12C, and FIG. 12D show four different views of the device 200.

Figure 13:
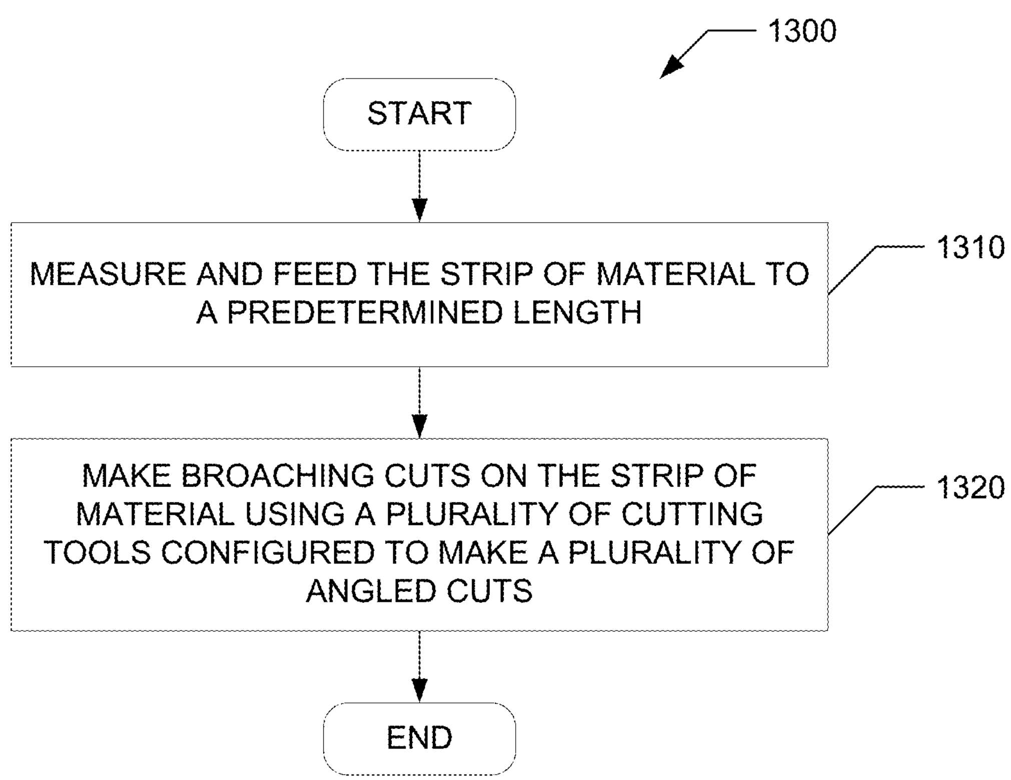
FIG. 13 is a functional flow diagram illustrating a method for processing a strip of material in accordance with one embodiment of the present disclosure.

FIG. 13 is a functional flow diagram illustrating a method 1300 for processing a strip of material in accordance with one embodiment of the present disclosure. At block 1310, the strip of material is measured and fed to a predetermined length. Then, broaching cuts are made on the strip of material, at block 1320, using a plurality of cutting tools configured to make a plurality of angled cuts.

In one embodiment, making broaching cuts on the strip of material using a plurality of cutting tools includes making multiple V cuts of different angles. In another embodiment, making broaching cuts on the strip of material using a plurality of cutting tools includes making at least one V cut and at least one flat cut. In yet another embodiment, making broaching cuts on the strip of material includes making broaching cuts using a plurality of linear broaching tools. In a further embodiment, making broaching cuts on the strip of material includes making cuts of varying angles using a plurality of rotating tools. In a further embodiment, the strip of material is leveled. In a further embodiment, small cuts are made on one side of the strip of material. In a further embodiment, the strip of material is marked so that the strip of material can be identified when strips of material are inserted into a die board. In a further embodiment, notching cuts are provided on the strip of material.

The above descriptions of the disclosed embodiments are provided to enable any person skilled in the art to make or use the invention. Various modifications to these embodiments will be readily apparent to those skilled in the art, and the generic principles described herein can be applied to other embodiments without departing from the spirit or scope of the invention. Thus, it will be understood that the description and drawings presented herein represent embodiments of the invention and are therefore representative of the subject matter which is broadly contemplated by the present invention. It will be further understood that the scope of the present invention fully encompasses other embodiments that may become obvious to those skilled in the art and that the scope of the present invention is accordingly limited by nothing other than the appended claims.

Accordingly, the foregoing embodiments are merely presented as examples and are not to be construed as limiting the present invention. The present teachings can be readily applied to other types of apparatus and/or devices. The description of the present invention is intended to be illustrative, and not to limit the scope of the claims. Many alternatives, modifications, and variations will be apparent to those skilled in the art.

What is claimed is:

1. A device for processing a strip of material to be folded into a shaped cutting blade for a die board, the device comprising:

a feeding unit configured to measure and feed the strip of material to a predetermined length; and a broaching unit configured to make broaching cuts on the strip of material, the broaching unit including a plurality of cutting tools configured to make a plurality of angled cuts including at least one V cut and at least one flat cut, wherein the broaching unit makes the at least one V cut into the plurality of angled cuts to be folded into appropriate angles for the shaped cutting blade, and the broaching unit makes the least on flat cut into at least one T intersection, wherein the broaching unit makes the plurality of angled cuts and the at least one T intersection to complete the shaped cutting blade for use in making pressing marks on a plate matter.

2. The device of claim 1, wherein the plurality of cutting tools makes multiple V cuts of different angles.

3. The device of claim 1, wherein the plurality of cutting tools comprises a plurality of linear broaching tools.

4. The device of claim 1, wherein the plurality of cutting tools includes a plurality of rotating tools configured to make cuts of varying angles.

5. The device of claim 1, further comprising a levelling unit configured to level the strip of material.

6. The device of claim 1, wherein the strip of material is a strip of cutting blade having a blade side and a non-blade side.

7. The device of claim 6, further comprising a nicking unit including a plurality of nicking tools of various sizes configured to make nicking cuts on a tip of the blade side of the strip of cutting blade to make the pressing marks on the plate matter without cutting the plate matter.

8. The device of claim 1, further comprising a printing unit configured to mark the strip of material so that the strip of material can be identified when strips of material are inserted into a die board.

9. The device of claim 1, further comprising a rotary punch unit including a plurality of punch unit configured to provide notching cuts on the strip of material.

10. An apparatus for processing a strip of material, the apparatus comprising:

means for measuring and feeding the strip of material;

means for making broaching cuts of varying angles on the strip of material; and means for controlling the means for measuring and feeding to determine an appropriate length to feed the strip of material into the apparatus and to determine the varying angles for the broaching cuts including V cuts and flat cuts, wherein the V cuts are made into a plurality of angled cuts to be folded into appropriate angles for the shaped cutting blade, and the flat cuts are made into T intersections, wherein making the plurality of angled cuts and the T intersection completes the shaped cutting blade for use in making pressing marks on a plate matter.

* * * * *